United States Patent
Kawasaki et al.

(10) Patent No.: US 6,386,425 B2
(45) Date of Patent: May 14, 2002

(54) METHOD OF FRICTION STIR WELDING STRUCTURAL BODY, STRUCTURAL BODY, AND EXTRUDED MATERIAL

(75) Inventors: Takeshi Kawasaki; Toshiaki Sagawa, both of Kudamatsu (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/791,812

(22) Filed: Feb. 26, 2001

(51) Int. Cl.⁷ ................................................ B23K 20/12
(52) U.S. Cl. ..................................... 228/112.1; 228/2.1
(58) Field of Search ............................... 228/112.1, 2.1

(56) References Cited

U.S. PATENT DOCUMENTS

| | | | |
|---|---|---|---|
| 6,050,474 A | * | 4/2000 | Aota et al. |
| 6,193,137 B1 | * | 2/2001 | Ezumi et al. |
| 6,237,829 B1 | * | 5/2001 | Aota et al. |
| 6,250,037 B1 | * | 6/2001 | Ezumi et al. |
| 6,273,323 B1 | * | 8/2001 | Ezumi et al. |
| 6,276,591 B1 | * | 8/2001 | Kawasaki et al. |
| 6,290,117 B1 | * | 9/2001 | Kawasaki et al. |
| 6,305,866 B1 | * | 10/2001 | Aota et al. |
| 6,315,187 B1 | * | 11/2001 | Satou et al. |
| 6,321,975 B1 | * | 11/2001 | Kawasaki et al. |

FOREIGN PATENT DOCUMENTS

| | | |
|---|---|---|
| EP | 0 797 943 | 9/1997 |
| EP | 1057574 A2 | 12/2000 |
| JP | 9-221024 | 8/1997 |
| JP | 2000288749 A | * 10/2000 |
| JP | 2000288750 A | * 10/2000 |
| JP | 2000-329295 | 11/2000 |
| JP | 1057574 A2 | * 12/2000 |
| JP | 0200107187 A | * 3/2001 |
| JP | 02001205458 A | * 7/2001 |
| JP | 02001205461 A | * 7/2001 |

OTHER PUBLICATIONS

Patent Abstracts of Japan, Publication No. 09–221024 Aug. 1997.
US 2001/0004992A1 Kawasaki et al. Jun. 28, 2001.*

* cited by examiner

Primary Examiner—Tom Dunn
Assistant Examiner—Kiley Stoner
(74) Attorney, Agent, or Firm—Antonelli, Terry, Stout & Kraus, LLP

(57) ABSTRACT

The object of the present invention is to weld a hollow-shaped material from one side, regardless of the size accuracy of the hollow-shaped material or the like, and to form the joint with higher strength. Projecting segments 12b, 22b of face plates of hollow-shaped materials 10, 20 are friction stir welded from above. Next, a connecting material 30 is placed on the upper face plates 11, 21 of the hollow-shaped materials 10, 20, and is friction stir welded from above. The welding region exists at the node between a rib connecting the two face plates 11, 12 (21, 22) and the face plate 11 (21). The joint of the connecting material 30 and the face plates 11, 21 are lap joint. Not butt joint. Therefore, the hollow-shaped materials could be welded with ease, even though there exists manufacturing tolerance, or tolerance in arrangement of the hollow-shaped materials 10, 20.

6 Claims, 4 Drawing Sheets

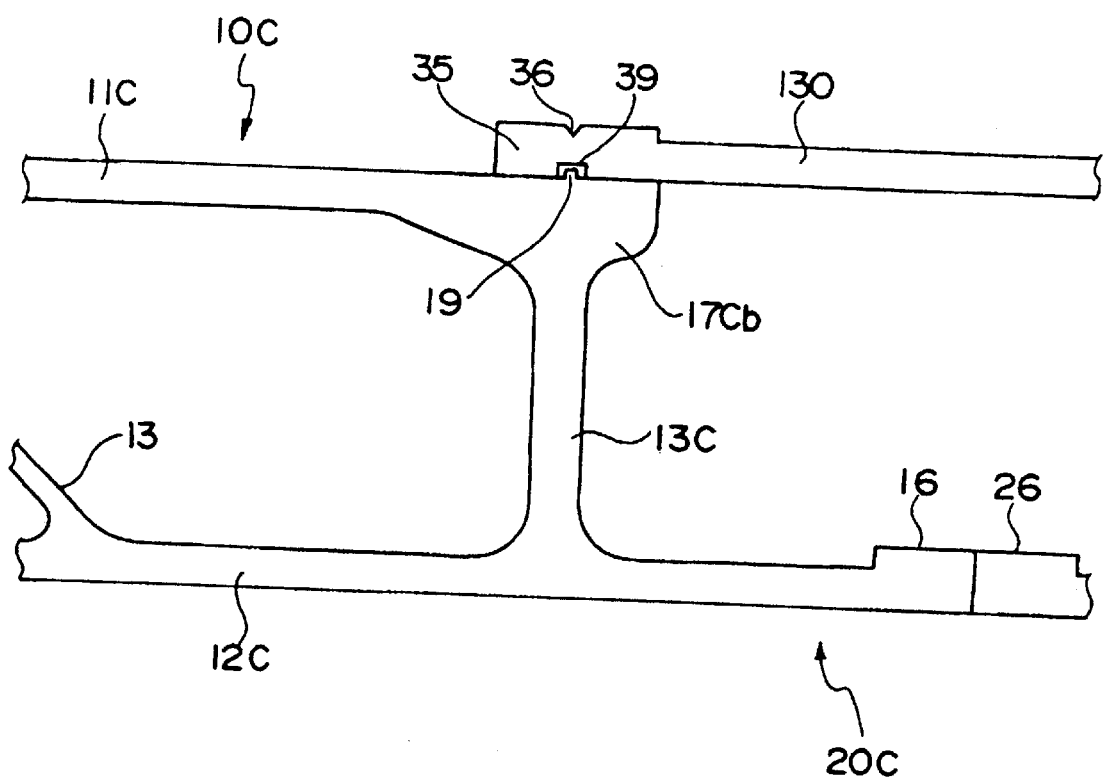

METHOD OF FRICTION STIR WELDING STRUCTURAL BODY, STRUCTURAL BODY, AND EXTRUDED MATERIAL

FIELD OF THE INVENTION

The present invention relates to a structural body made of hollow-shaped material and a method of manufacturing the same. For example, the present invention is preferably applied to manufacturing of structural bodies formed from hollow extruded materials made of aluminum alloy which are used in a railway car, a building structure, and the like.

DESCRIPTION OF THE RELATED ART

A friction stir welding method is a technique using a round shaft (called a rotary tool) being inserted into the welding region of members and moving the rotating rotary tool along the joint line, thereby heating, mobilizing, fluidizing and plasticising the welding region, and realizing a solid-phase welding of the members. The rotary tool is comprised of a small-diameter portion to be inserted into the welding region, and a large-diameter portion positioned at the outer side thereof. The small-diameter portion and the large-diameter portion are coaxial. The boundary between the small-diameter portion and the large-diameter portion is slightly inserted into the welding region. This technique is disclosed in Japanese Patent Laid-Open No. H9-309164 (EP0797043A2).

FIG. 9 of the literature discloses welding two faces of the hollow extruded materials from one side. Also, the same discloses a joint which prevents deformation of the hollow-shaped material.

SUMMARY OF THE INVENTION

The case where a hollow-shaped material is friction stir welded from one side, as is disclosed in FIG. 9 of the above-mentioned Japanese Patent Laid-Open No. H9-309164 (EP0797043A2) will be considered. In such case, the interval between the upper plates 33, 33 of the two hollow-shaped materials 31, 32 (that is, the interval between the concave portions 39, 39), and the accuracy of the width of the joint 60 being arranged to the region are important. If the interval between the upper plates 33, 33 is smaller than the width of the joint 60, then the joint 60 cannot be arranged thereto. On the other hand, if the interval between the upper plates 33, 33 is larger than the width of the joint 60, it is difficult to perform friction stir welding. That is, it is important to maintain the gap in the butted region between the plate 33 and the joint 60 small.

However, there tends to be formed a large gap in the butted region due to the manufacturing tolerance in the extrusion of hollow-shaped materials 31, 32 or the joint 60. This becomes noticeable in the case where many hollow-shaped materials are juxtaposed and welded, as is in the case of welding a car body of a railway car.

On the other hand, welding the joint 60 to the concave portion 39 by lap joint is possible. By doing so, the interval between the concave portions 39, 39 (interval between the plates 33, 33) could be formed sufficiently larger than the joint 60, and the materials 31, 32 could be manufactured with ease.

However, in such case, the material bends at the connecting region between the plate 33 and the concave portion 39. Therefore, stress concentrates at this region, and the generated stress is increased. Moreover, friction stir welding is performed at the vicinity of the flexure, so that the strength is deteriorated due to the heat effect generated by the welding. As a result of the synergy of these strength deteriorating factors, the allowable stress is greatly deteriorated.

The object of the present invention is to enable welding of the hollow-shaped material from one side, regardless of the size accuracy of the hollow-shaped material and the like.

The second object of the present invention is to enable positioning of the lap joint with ease.

The above-mentioned objects could be achieved by a method of friction stir welding a structural body, the method comprising:

preparing two hollow-shaped materials, each hollow-shaped material including two face plates which are connected by a plurality of ribs, and an end portion of one of the face plates being further projected than an end portion of the other face plate, in which each face plate at the external side of the hollow-shaped materials is substantially flat;

welding the projected face plates together from the other face plate side with friction stir welding;

overlapping a connecting material which is substantially parallel to the projected one of face plates to an end portion of each other face plate of the hollow-shaped materials, in which the position of said connecting material relative to the hollow-shaped materials is determined by a convex portion provided either to the connecting material or to the other face plate during the overlapping; and friction stir welding said overlap from the external side of the hollow-shaped material.

The second object mentioned above could be achieved by a method of friction stir welding a structural body, comprising:

overlapping an end portion of a first member on top of an end portion of a second member, the position of the first member relative to the second member being determined by a convex portion provided to the first member or the second member during the overlapping; and friction stir welding the overlap.

BRIEF DESCRIPTION OF THE DRAWINGS

FIG. 7 is a longitudinal cross-sectional view of the feature of another embodiment of the present invention.

DETAILED DESCRIPTION OF PREFERRED EMBODIMENTS

A preferred embodiment of the present invention will now be explained with reference to FIG. 1 through FIG. 4. There will be cases where reference numbers not indicated in FIG.

Figure 1:
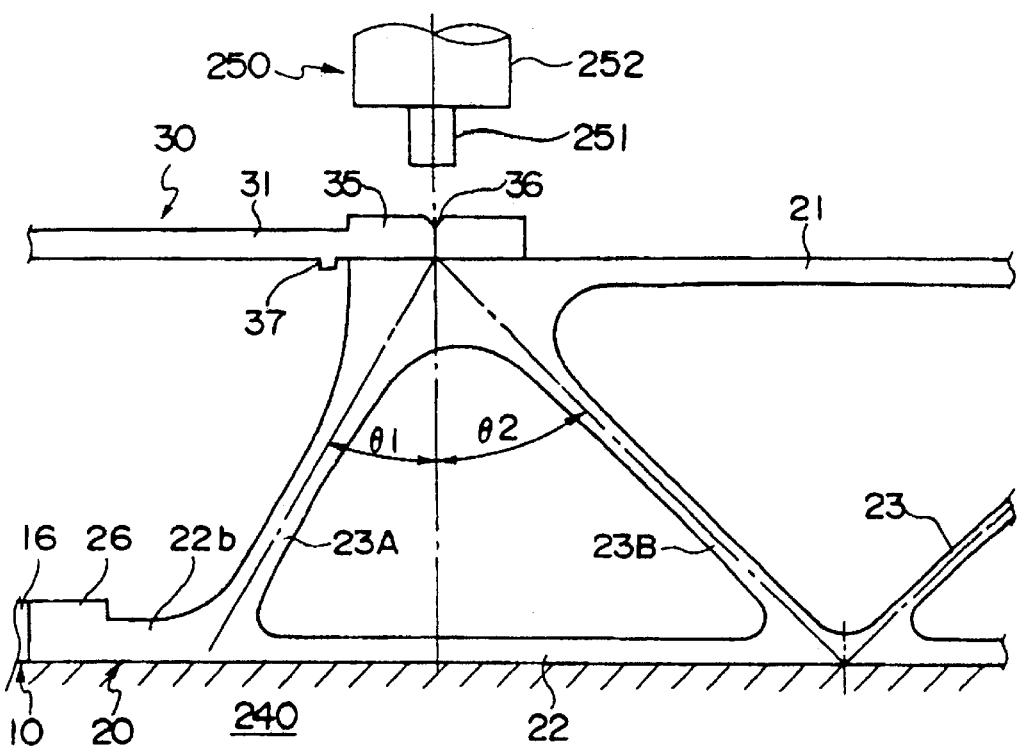
FIG. 1 is a longitudinal cross-sectional view of the feature of the welding region according to an embodiment of the present invention.
Figure 2:
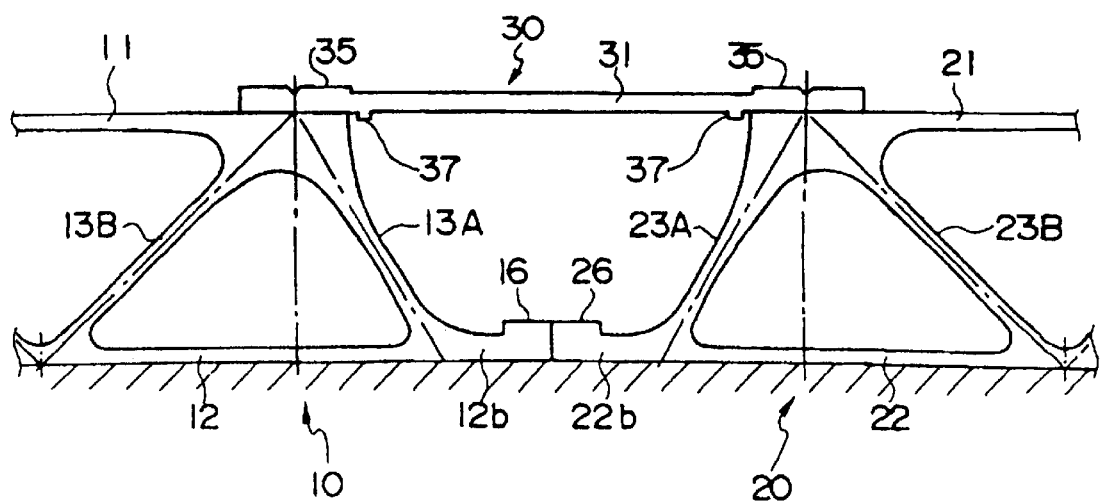
FIG. 2 is a longitudinal cross-sectional view of the welding region according to an embodiment of the present invention.
Figure 3:
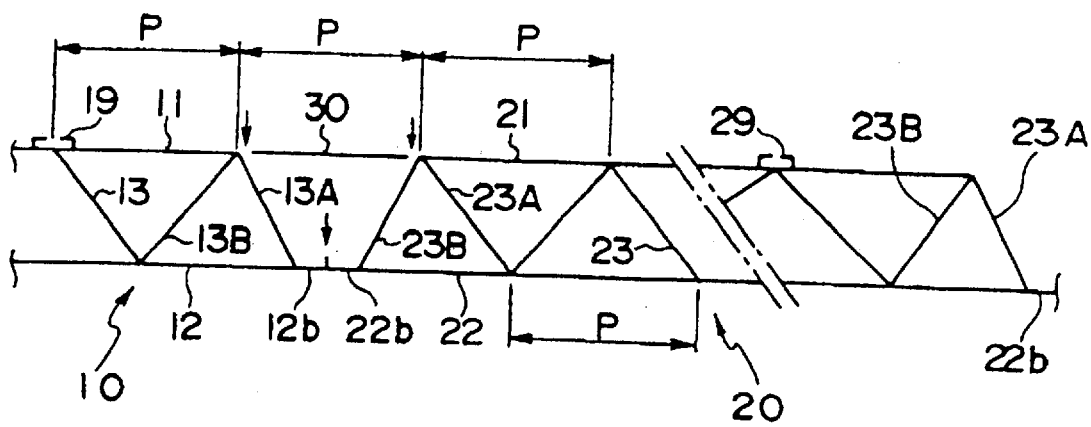
FIG. 3 is a longitudinal cross-sectional view of a pair of hollow-shaped materials according to an embodiment of the present invention.
Figure 4:
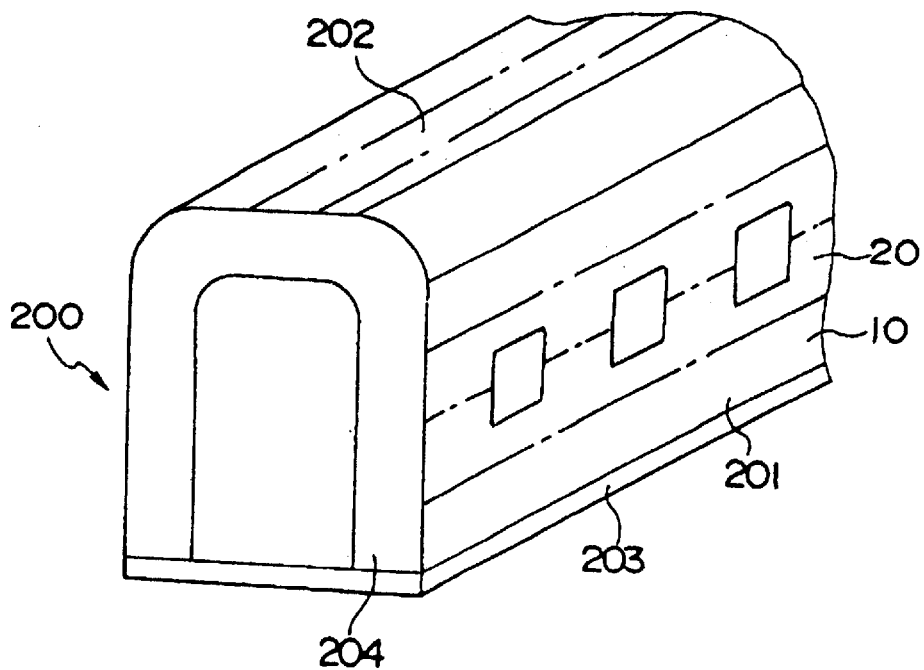
FIG. 4 is a perspective view of a car body of a railway car.

1 is used in the following explanation. In such cases, the reference number subtracted by 10 corresponds to the reference number of the part in the left half of the drawings. FIG. 1 is an enlarged view of the feature of FIG. 2, FIG. 2 is an enlarged view of the feature of FIG. 3, and FIG. 3 is a longitudinal cross-sectional view of the feature of the side structure of FIG. 4.

A car body 200 is comprised of side structures 201 constituting the side surfaces, a roof structure 202 constituting the roof, an underframe 203 constituting the floor, and end structures 204 constituting the end portions in the longitudinal direction. The side structures 201, the roof structure 202 and the underframe 203 are formed by welding a plurality of extruded materials together, respectively. The longitudinal direction of the extruded material is positioned toward the longitudinal direction of the car body. The extruded material is a hollow-shaped material made of aluminum alloy.

The structure and the welding method of the hollow-shaped materials 10, 20 constituting the side structure 201 will be explained. The same applies to other regions, and other structures.

The hollow-shaped materials 10, 20 are each comprised of two face plates 11, 12 and 21, 22, and a plurality of ribs 13, 23 arranged in a truss shape. The two face plates 11, 12 (21, 22) are substantially parallel. The pitch of the trusses by the ribs 13, 23 are uniform. The trusses are constituted by the center lines of the plate thickness of the face plates 11, 12, 21, 22 and the ribs 13, 23. The apexes are positioned on the face plates 11, 12, 21, 22 side.

To the vicinity of the apexes of the trusses at the inner side of the car, there are unitarily provided rails 19, 29 for mounting equipments thereto. The rails 19, 29 are comprised of two L-shaped members. The rail becomes a mounting seat for equipments such as an interior board or a chair and the like.

The end portion of the face plates 12, 22 positioned to the outer surface side of the car body is projected further towards the adjacent hollow-shaped materials 20, 10 side than the end portion of the face plates 11, 21 at the inner side of the car. The projected face plates are called 12b, 22b. Friction stir welding is performed by butting the end portion of the face plates 12b, 22b against each other. The end portions are abutted against each other in order to minimize the gap in the butted region. The plate thickness of the face plates 12b, 22b are thicker than the plate thickness of the face plates 12, 22 at other regions.

The hollow-shaped materials 10, 20 are placed on a bed 240 with the face plates 12, 22 downward. The face plates 11, 21 side are positioned upward. Friction stir welding is performed by inserting a rotary tool 250 into the welding region from above. It may be said that the friction stir welding is performed from the inner side of the car.

The end portion of the face plates 12b, 22b are provided with convex portions 16, 26 projecting towards the inner side of the car (that is, toward the face plates 11, 21 side). The width and height of the convex portions 16, 26 are substantially the same.

The end portion of the face plate 11 and the end portion of the face plate 21 at the inner side of the car are welded through a connecting material 30. The connecting material 30 is placed on (overlaps) the face plates 11, 21. The welding region is at the node between the rib 23A (13A) and the rib 23B (13B).

A convex portion 35 projecting upwardly is provided to each end of the connecting material 30. The upper surface of the convex portion 35 is provided with a V-shaped groove 36. The groove 36 is positioned at the center of width of the convex portion 35. The width of the convex portion 35 is larger than the diameter of a large-diameter portion 252 of the rotary tool 250. The groove 36 acts as the object of position detection for guiding the rotary tool 250. The groove 36 is detected with the use of a laser sensor, so that the axial center of the rotary tool 250 coincides with the groove 36. The node between the two ribs 13A (23A) and 13B (23B) exists on the extension of the groove 36, that is, on the axial center of the rotary tool 250.

To the surface opposite to the convex portions 35, 35, there are provided convex portions 37, 37. The interval of the convex portions 37, 37 is smaller than the interval between the end portion of the face plates 11, 21. The width of the convex portion 37 is narrower than that of the convex portion 35.

The overlapping surfaces between the connecting material 30 and the face plates 11, 21 are flat without any inequality, so that they are in contact with each other. The connecting material 30 is an extruded material made of the same material with the hollow-shaped materials 10, 20. The length of the connecting plate 30 is the same as the length of the hollow-shaped materials 10, 20.

The distance P from the end portion of the face plate 11 to the end portion of the face plate 21 (distance from the apex of the truss at the end portion of the hollow-shaped material 10 to the apex of the truss at the end portion of the hollow-shaped material 20) is the same as the pitch P of the trusses at other locations.

The trusses of the hollow-shaped material are isosceles triangles, when setting the apexes on the face plates 11, 12, 21, 22 side. However, the truss at the end portion of the hollow-shaped materials 10, 20 is not an isosceles triangle. The ribs 13A, 23A constituting the truss at the end portion of the hollow-shaped materials 10, 20 are at an angle of 1 to the vertical line. The ribs 13B, 23B constituting the truss of the end portion mentioned above are at an angle of 2 to the vertical line. The angle 1 is smaller than the angle 2.

Therefore, the rib 13A (23A) is connected to the intermediate point of the face plate 12 (22). A space for inserting the friction stir welding device is formed at the interval between the connecting region of the rib 13A and the face plate 12 and the connecting region of the rib 23A and the face plate 22.

Because the ribs 13A, 23A are more vertical than the ribs 13B, 23B (1 is smaller), the plate thickness of the ribs 13A, 23A are thicker than the plate thickness of the ribs 13B, 23B. The plate thickness of the ribs 13B, 23B are thicker than that of the other ribs 13. The connecting regions between ribs 13A, 13B, 13 and the face plates 11, 12, 21, 22 are arcuate. The thickness of the connecting region is determined in light of strength.

The method of producing the structural body will be explained. The hollow-shaped materials 10, 20 are placed on the bed 240, and are fixed thereto. The butted region at the end portion of the face plates 12b, 22b are either in contact with each other, or positioned close by. The convex portions 16, 26 of the butted region between the face plates 12, 22 are temporarily joined by arc welding from above. The temporarily welding is carried out intermittently.

The upper surface of the bed 240 for placing the butted region between the face plates 12b, 22b is flat. The vicinity of the butted region between the face plates 12b, 22b, the vicinity of the node between the ribs 13A, 23A and the face plates 12b, 22b, and the vicinity of the node between the ribs 13B, 23B and the face plates 12, 22 are all placed on the bed 240 having the same height.

In such state, the rotary tool 250 of the friction stir welding device is inserted to the butted region between the convex portions 16, 26 from above, and is moved along the joint line, so as to perform friction stir welding. The axial center of the rotary tool 250 is vertical (direction along the normal of the welding region). However, the axial center of the rotary tool is inclined relative to the moving direction of the rotary tool 250, as is known in the art. The butted region between the two convex portions 16, 26 is detected with the aforementioned sensor, in order to determine the position of the gap. The axial center of the rotary tool 250 is positioned at the gap.

The rotary tool 250 is comprised of a large-diameter portion 252 and a small-diameter portion 251 at the leading end thereof. The leading end of the small-diameter portion 251 is positioned at the vicinity of the lower surface of the face plates 12b, 22b. The lower end of the large-diameter portion 252 is positioned between the peak of the convex portions 16, 26 and the surface of the face plates 12b, 22b at the inner side of the car (surface at the face plates 11, 21 side). The diameter of the large-diameter portion 252 is smaller than the sum width of the two convex portions 16, 26. The small-diameter portion 251 is a screw portion.

As a result of the friction stir welding, the gap existing at the butted region between the face plates 12b, 22b is infilled and welded. The outer surface side (outer side of the car) of the butted region is welded evenly. There exists no concave portion of the joint line at the external side of the face plates 12b, 22b.

The upper surfaces of the convex portions 16, 26 are concaved by the large-diameter portion 252 of the rotary tool 250. The non-welded region remains at both sides of the concave portion.

Next, the connecting material 30 is placed on the face plates 11, 21. The overlap between the connecting material 30 and the face plates 11, 21 becomes the predetermined size by the convex portions 37, 37. The end portions of the connecting material 30 are temporarily fixed against the face plates 11, 21 by arc welding. The temporary welding is performed intermittently. The welding is fillet welding.

Subsequently, the lap welding between the connecting material 30 and the face plates 11, 21 are performed using the friction stir welding device used in the friction stir welding of the butted region between the face plates 12b, 22b. The rotary tool 250 is inserted to the overlap between the connecting material 30 and the face plate 21 (11) from above, and is moved along the joint line (that is, along the groove 36), so as to perform friction stir welding. The joint line is positioned toward the longitudinal direction of the material.

The width of the convex portion 35 is larger than the diameter of the large-diameter portion 252 of the rotary tool 250. The groove 36 is provided at the center of the width of the convex portion 35. The axis of rotation of the rotary tool 250 is coincided with the groove 36. That is, the rotary tool 250 is positioned to the inner side of the end portion of the connecting material 30 which will not be friction stir welded. Also, the leading end of the small-diameter portion 251 of the rotary tool 250 is inserted deeper than the external surface of the face plates 11, 21. The lap welding is thus carried out. The lower end of the large-diameter portion 252 is positioned between the upper surface of the connecting material 30 other than the convex portion and the peak of the convex portion 35.

The upper surface of the convex portion 35 is concaved by the large-diameter portion 252 of the rotary tool 250. The non-welded region remains at both sides of the concave portion.

The aforementioned sensor of the friction stir welding device detects the groove 36, and moves the rotary tool 250 along the groove 36. Therefore, the positional relationship between the rotary tool 250 and the sensor, which is used during welding of the butted region between the face plates 12b, 22b, may entirely be used herein. The other relationship between the rotary tool and the welding region are the same as those mentioned before.

The axial center of the rotary tool 250 is positioned on the vertical line passing through the apex of the truss by the two ribs 13A, 13B (23A, 23B), or through the vicinity thereof. In order to prevent defects caused by deflection, measures such as the increase of the plate thickness of the ribs 13A, 13B (23A, 23B), the shape of the arc connecting the rib and the face plate, and the thickness of the connecting region, and the like are taken.

The welding of the connecting material 30 is performed first with the face plate 11, then with the face plate 21. The welding of both ends of the connecting material 30 may be performed simultaneously by using two rotary tools.

With such method, the welding of the connecting material 30 is a lap joint and not butt joint. Therefore, the connecting material 30 could be welded, even when the gap between the two hollow-shaped materials 10, 20 changes due to the manufacturing tolerance of the two hollow-shaped materials 10, 20, or the tolerance in the interval of arrangement of the two hollow-shaped materials. In particular, error is increased in the case where many hollow-shaped materials are juxtaposed and welded simultaneously. In such case, the welding could be performed with ease, since the welding is a lap joint.

Also, because the connecting material 30 is welded overlapping the face plates 11, 21, the flexuous regions at the face plate side of the hollow-shaped materials 10, 20 are eliminated, resulting in eliminating stress concentration.

Moreover, the welding of both surfaces of the hollow-shaped material could be performed from one side. Therefore, there is no need to turn over the structural body after completing welding of one of the surfaces. Accordingly, the structural body could be manufactured inexpensively as well as highly precisely.

Furthermore, the external surface of the welding region between the face plates 12b, 22b is flat. The convex portions 16, 26, 35 are positioned inside the structural body or to the inner side of the car, and not at the region where flat surface is required (external surface side, outer side of the car). Also, there exists no concave portion at the outer side of the car, which is formed by being cut with the rotary tool. Therefore, there is no need to cut the convex portion and the like, enabling inexpensive manufacturing of a car body.

Still further, the inserting strength during welding of the connecting material 30 is borne by the two ribs 13A, 13B (23A, 23B) arranged towards the axial center of the rotary tool 250. Therefore, bending of the ribs 13A, 13B (23A, 23B) could be restrained. Also, the plate thickness of the ribs 13A, 13B (23A, 23B) could be thinned, achieving reduction in weight. Needless to say, bending of the face plates 11, 21, 30 could also be restrained.

The height of the bed 240 for supporting the ribs 13A, 13B (23A, 23B) is uniform, so that bending of the face plates 12, 22 could be prevented.

Moreover, considering the case where the materials after welding are used as a structural body, substantially all parts are constituted from the truss structure. The welding region between the hollow-shaped materials 10, 20 is also the truss structure. Therefore, outward shearing rigidity is improved, resulting in reduction in weight.

The connecting material 30, the face plates 12b, 22b between the ribs 13A, 23A, and the ribs 13A, 23A substantially constitute a truss, so that this region is not particularly weak. However, the plate thickness should be considered.

Still further, the tilt angle 1 of the ribs 13A, 23A may be formed larger than the tilt angle 2 of the ribs 13B, 23B. By doing so, the width of the connecting material 30 is enlarged, so that it is necessary to thicken the plate thickness thereof, resulting in increase in overall weight. However, it is useful in the case where large opening is needed to insert the friction stir welding device.

The tilt angles 1, 2 may be formed the same to obtain an isosceles triangle. By doing so, the plate thickness of the ribs 13A, 13B (23A, 23B) could be formed the same. Moreover, the plate thickness of the ribs 13A, 23A may be thinner than in the case shown in FIG. 1. However, when the size of the truss of the isosceles triangle is identical to the size of the truss in other regions, the width of the connecting material 30 is increased.

When the tilt angles 1, 2 of the two ribs 13A, 13B (23A, 23B) are set at tilt angle 1 in FIG. 1, the truss at the end portion could be formed in a small isosceles triangle. The length of the base of the truss at the end portion is smaller than the length of the base of the truss in other regions. By doing so, the distance between the node of the rib 13B (23B) and the face plate 12 (22) and the end portion of the hollow-shaped material 10 (20) could be shortened. Therefore, the width of the connecting material 30 may be formed the same as the width of the connecting material 30 in FIG. 1.

Every pitch of the trusses is identical, including the region with the connecting material 30. The size of the trusses is identical, excluding the truss at the end portion. Therefore, the design of the hollow-shaped material could be standardized.

The node between the two ribs 13A, 13B (23A, 23B) may be formed to the external side than the face plates 11, 21.

Moreover, the rotary tool 250 may be inserted at an angle toward the middle of the angle formed by the two ribs 13A, 13B (23A, 23B). In this case, the axial center is positioned toward the apex of the truss.

The welding of the connecting material 30 in the above-mentioned embodiment is performed by friction stir welding. However, it may be combined with arc welding. The above-mentioned friction stir welding is a lap joint, so that welding strength is weak compared to the case of a butt joint. Therefore, the butted regions between the end portions of the connecting material 30 and the face plates 11, 21 are arc welded. The arc welding is performed to the region with inferior strength and the like. Also, arc welding may be used for repairing.

In the above-mentioned embodiment, both ends of the connecting material 30 are welded by friction stir welding. However, one end may be performed with friction stir welding and the other end may be performed with arc welding. In such case, friction stir welding is performed first, because arc welding deforms more than friction stir welding.

In the above-mentioned embodiment, the face plates 11, 12, 21, 22 are parallel. However, the present invention could be applied to the case where one of the face plates is inclined relative to the other face plate.

The plate thickness of the ribs 13A, 13B (23A, 23B) is thicker towards the face plates 11, 21 side than the face plate 12, 22 side. The plate thickness is thickened towards the face plates 11, 21 side because the region tends to be exposed to high temperature during welding.

In the above-mentioned embodiment, the face plates at the welding region are horizontal. However, welding may be performed even in the case where the normal of the face plates at the welding region are inclined. This tends to happen in the joint line at the end portion of the side structure 201. In this case, the axial center of the rotary body is positioned along the normal of the face plate.

The groove 36 may be changed to a convex portion.

Figure 5:
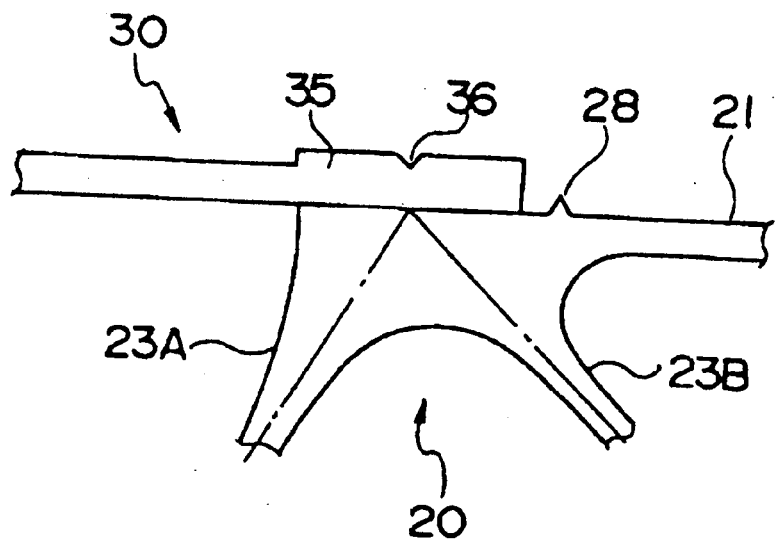
FIG. 5 is a longitudinal cross-sectional view of the feature of another embodiment of the present invention.

The embodiment shown in FIG. 5 will be explained. The convex portions 37, 37 of the connecting material 30 are taken away, and are replaced with a triangular convex portion 28 at the upper surface of the face plate 21. Similar convex portion is formed to the face plate 11. The distance between a pair of convex portions 28 is larger than the width of the connecting material 30. By doing so, the interval between the convex portion 28 and the end portion of the connecting material 30 could easily be confirmed visually. Therefore, it is easy to confirm that the connecting material 30 is overlapped against the face plates 11, 21 at the predetermined position.

Figure 6:
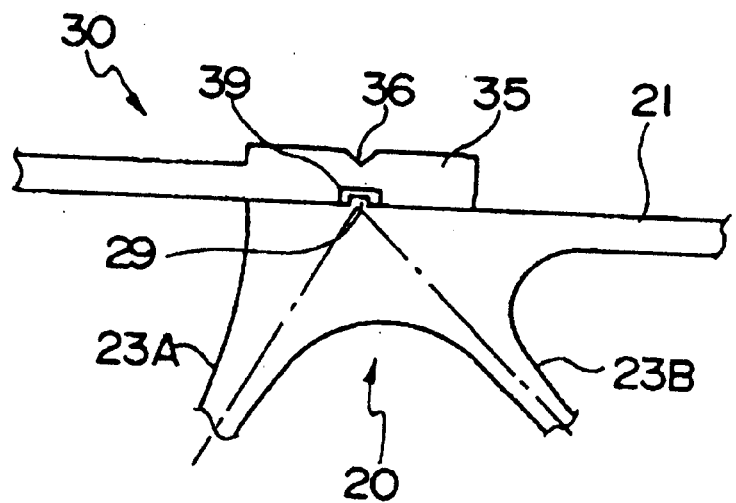
FIG. 6 is a longitudinal cross-sectional view of the feature of another embodiment of the present invention.

The embodiment shown in FIG. 6 will be explained. A convex portion 29 is provided at the upper surface of the face plate 21 (11) at the place where the rotary tool 250 is to be inserted (at the vicinity of the node between the two ribs 23A, 23B). The lower surface of the connecting material 30 is provided with concave portions 39 for engaging with the convex portions 29. The width of the concave portion 39 is sufficiently larger than the width of the convex portion 29, taking into consideration the tolerance of the interval between the pair of convex portions 29. The width of the concave portion 39 is smaller than the diameter of the small-diameter portion 251 of the rotary tool 250. The rotary tool 250 is inserted until the lower end of the small-diameter portion 251 reaches below the base of the convex portion 29 (lower than the upper surface of the face plate 21). The width of the concave portion 39 and the convex portion 29 are smaller than the width of the convex portion 35.

By doing so, the space between the concave portion 39 and the convex portion 29 is filled using the material of the convex portion 35 as the source. The space is filled because the material of the corresponding member is forced downward by the large-diameter portion 252 of the rotary tool. The material of the convex portion 30 does not always moves to the above-mentioned space.

In the case where the connecting material 30 and the hollow-shaped material 20 are welded by friction stir welding, the two members are connected against each other so that there exists as little space as possible therebetween. However, there exists a space between the concave portion 39 and the convex portion 29 for absorbing the manufacturing tolerance. When friction stir welding is performed while the above-mentioned space still exists, the material for filling the space tends to fall short. Therefore, defects tend to occur at interior or exterior of the welding region.

Thus, friction stir welding is performed after filling powdery or fibrous filler to the space between the concave portion 39 and the convex portion 29. The material used herein is an identical material or a material of the same group with the connecting material 30 or the hollow-shaped material 20. Powdery or fibrous material deforms easily, so that they could absorb the tolerance and fill the space regardless of the positional relationship between the concave portion 39 and the convex portion 29.

The upper surface of the face plate 31 may be provided with a concave portion, and the lower surface of the connecting material 30 may be provided with a convex portion for engaging with the above-mentioned concave portion. In this case, the thickness of the welding region at the hollow-shaped material 20 side is thickened.

The embodiment shown in FIG. 7 will now be explained. The rib 13C at the end portion of the hollow-shaped material 10C is perpendicular to the face plates 11C, 12C (along the normal of the face plate). The axis of rotation of the rotary tool 250, the groove 36, the concave portion 39, and the convex portion 19 are all provided within the range of the plate thickness of the rib 13C. The convex portion 19 corresponds to the convex portion 29. In this embodiment, the inserting force during friction stir welding is borne by the rib. Reference number 17Cb denotes a projecting segment for placing the connecting material 30. The rib at the end portion of the other hollow-shaped material may be formed the same.

The convex portion 37, the convex portion 28, the concave portion 39, and the convex portion 29 are explained as the positioning means. However, they are not only applicable to friction stir welding of the hollow-shaped materials, but also to the lap joint of the members.

The technical scope of the present invention is not limited to the terms used in the claims or in the summary of the present invention, but is extended to the range in which a person skilled in the art could easily substitute based on the present disclosure.

According to the present invention, the hollow-shaped material could be welded from one side, regardless of the size accuracy of the hollow-shaped material or the like. Moreover, the joint could be formed with higher strength.

Still more, positioning is made simple in friction stir welding.

We claim:

1. A method of friction stir welding a structural body, comprising:

overlapping an end portion of a first member on top of an end portion of a second member, the position of said first member relative to said second member being determined by a convex portion provided to said first member or said second member during said overlapping; and friction stir welding said overlap.

2. A method of friction stir welding a structural body according to claim 1, wherein:

an overlap surface of said first member is provided with a concave portion, and a convex portion provided to an overlap surface of said second member is inserted into said concave portion; and friction stir welding said inserted region with said friction stir welding.

3. A method of friction stir welding a structural body according to claim 2, wherein said friction stir welding is performed while arranging powdery or fibrous material between said concave portion and said convex portion.

4. A method of friction stir welding a structural body according to claim 2, wherein said friction stir welding is performed from said first member side.

5. A method of friction stir welding a structural body, the method comprising:

preparing two hollow-shaped materials, each said hollow-shaped material including two face plates which are connected by a plurality of ribs, and an end portion of one of said face plates being further projected than an end portion of the other said face plate, in which each said face plate at the external side of said hollow-shaped materials is substantially flat;

welding said projected face plates together from said other face plate side with friction stir welding;

overlapping a connecting material which is substantially parallel to said projected one of face plates to an end portion of each said other face plate of said hollow-shaped materials, in which the position of said connecting material relative to said hollow-shaped materials is determined by a convex portion provided either to said connecting material or to said other face plate during said overlapping; and friction stir welding said overlap from the external side of said hollow-shaped material.

6. A friction stir welding method of a structural body according to claim 5, wherein:

a surface of said connecting material overlapping said other face plate is provided with a concave portion, and a convex portion provided to said other face plate is inserted into said concave portion; and friction stir welding is performed to said inserted region.

* * * * *